United States Patent [19]

Valles Pousa

[11] Patent Number: 5,775,829
[45] Date of Patent: Jul. 7, 1998

[54] END JOINER FOR CONTINUOUS BELTS FOR CONVEYORS

[75] Inventor: Ana Marie Valles Pousa, Barcelona, Spain

[73] Assignee: Valfor, S.A., Barcelona, Spain

[21] Appl. No.: 660,978

[22] Filed: Jun. 12, 1996

[51] Int. Cl.$^6$ .................................................. F16C 11/04
[52] U.S. Cl. .......................... 403/119; 403/161; 403/364; 198/844.2
[58] Field of Search ........................ 403/364, 294, 403/119, 161–163, 154, 155, 157, 159, 180, 152, 24; 198/844.2; 24/33 C, 31 L, 31 H, 33 R, 33 P; 474/253, 255–258

[56] References Cited

U.S. PATENT DOCUMENTS

| 3,324,991 | 6/1967 | Voss | 198/844.2 |
|---|---|---|---|
| 4,023,239 | 5/1977 | Stolz | 474/257 X |
| 4,138,011 | 2/1979 | Lapeyre | 198/844.2 |
| 4,344,209 | 8/1982 | Harwood | 198/844.2 X |
| 4,881,843 | 11/1989 | Randleman | 403/161 X |
| 5,015,220 | 5/1991 | Legge et al. | 474/253 X |
| 5,048,675 | 9/1991 | Nadalutti | 198/844.2 |
| 5,250,001 | 10/1993 | Hansen | 403/163 X |

FOREIGN PATENT DOCUMENTS

| 3115006 | 5/1991 | Japan | 198/844.2 |
|---|---|---|---|

*Primary Examiner*—Harry C. Kim
*Attorney, Agent, or Firm*—Stephen T. Falk, Esq.

[57] ABSTRACT

The invention comprises an end joiner for continuous belts for conveyors comprising a hinge of a plastic material joined to a supporting fabric fused into the continuous belt by vulcanizing. The hinge is formed by two equal hinge halves, each made up of members that can be linked in rows. Each linkable member consists of at least one ring fitted with a male coupler and a female coupler, the two couplers lying opposite and coaxial to each other. When joined together, the couplers form a rod. In the assembled hinge, the rings of the half-hinges are interleaved together with their openings substantially aligned, with a pin passing through all of them. The supporting fabric is fitted with a band with no warp threads, situated at different distances from the edges of the supporting fabric.

9 Claims, 3 Drawing Sheets

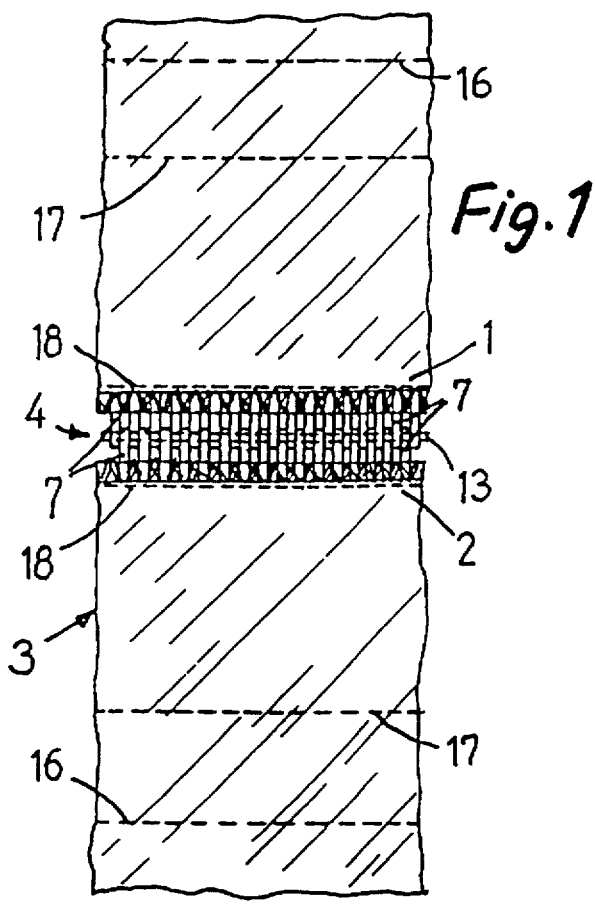
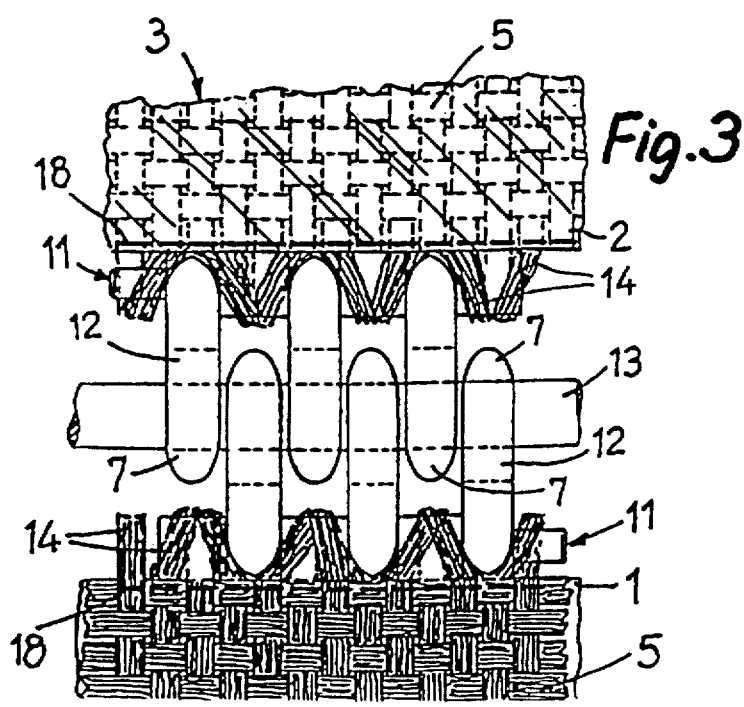

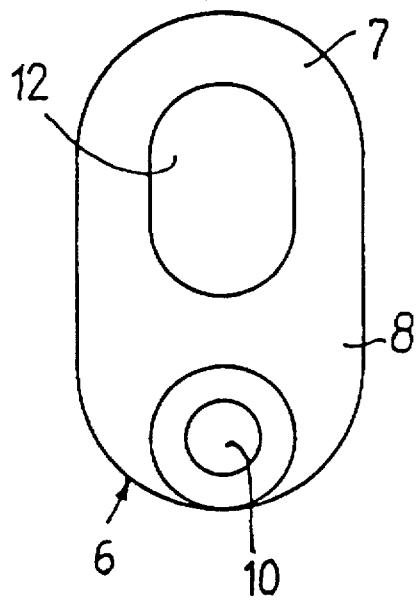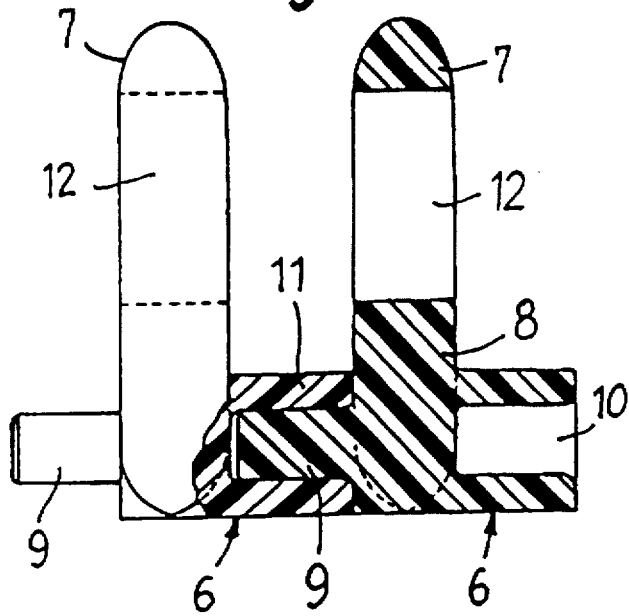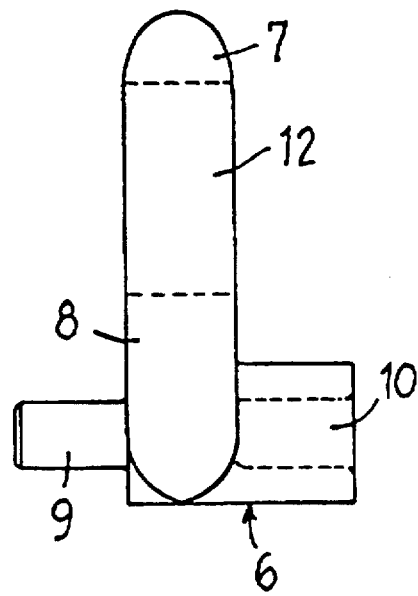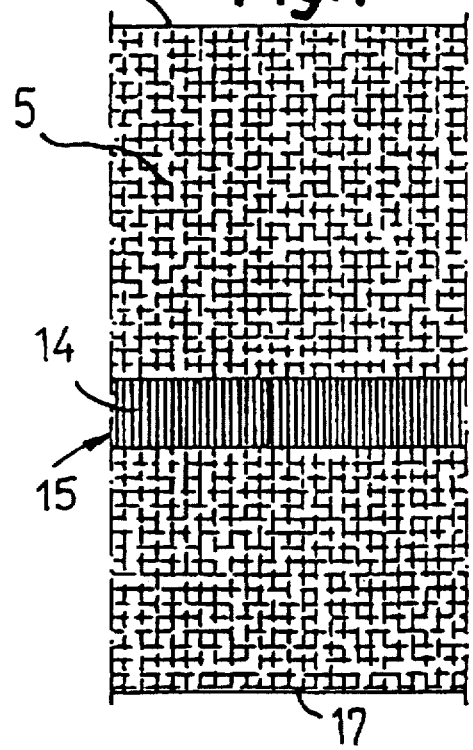

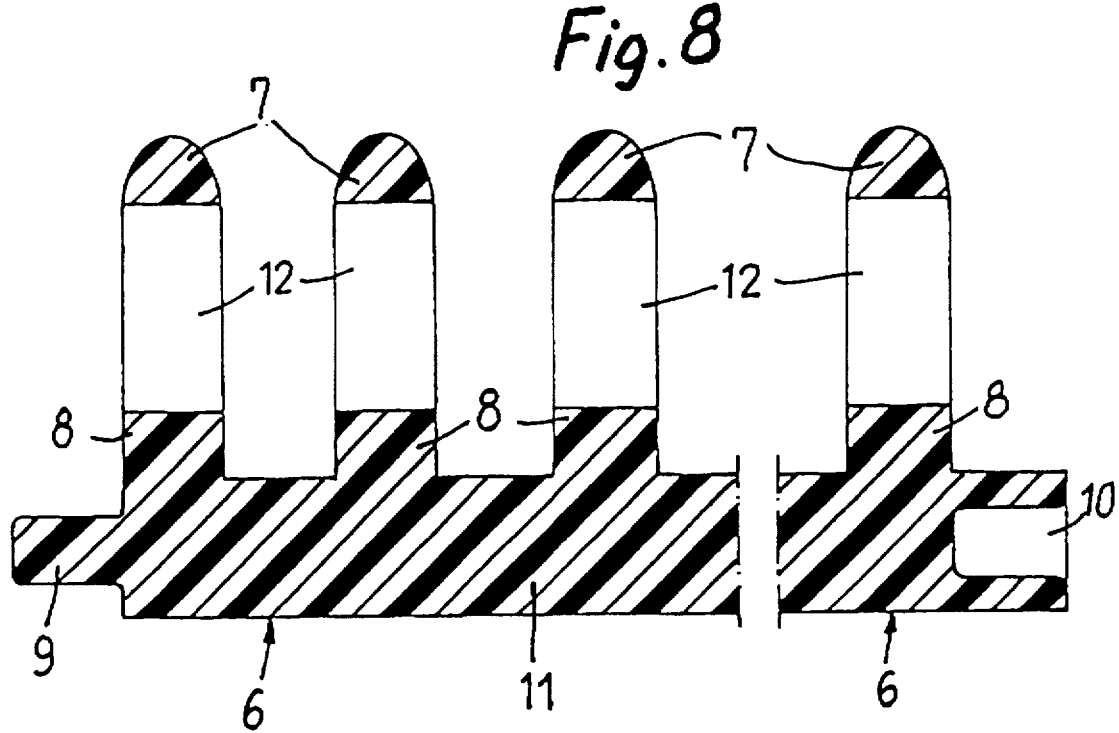
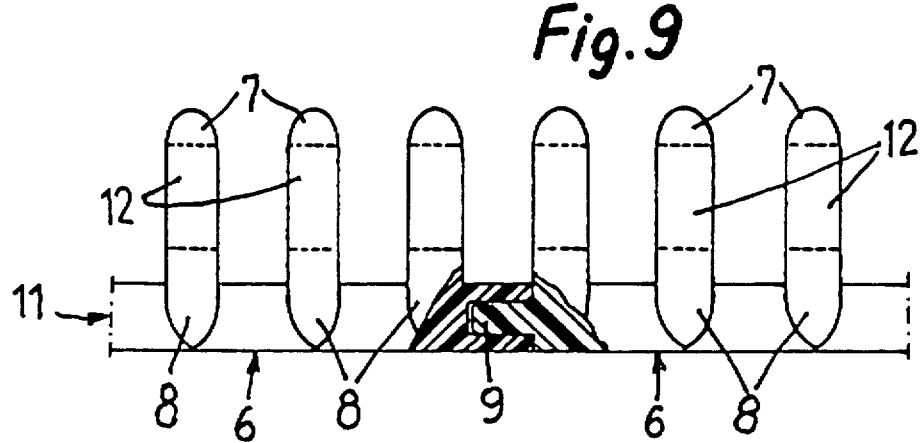

END JOINER FOR CONTINUOUS BELTS FOR CONVEYORS

FIELD OF THE INVENTION

This invention pertains to a means for forming a continuous belt, for example a conveyor belt. In particular, the invention comprises an end joiner comprising a hinge of a plastic material joined to the weft of a supporting fabric and fused into the continuous belt by vulcanizing, the hinge comprising two equal hinge halves, one at each transverse end edge of the belt, designed to link together in the joiner forming the hinge.

BACKGROUND OF THE INVENTION

Belts for conveying devices have been known from time immemorial. They have a continuous belt that moves longitudinally to itself, borne by at least two rollers or drums, one for driving the belt and the other for returning it.

Belts for conveyors are of flexible, non-elastic material, and their transverse end edges are joined together by an articulated joint acting as a hinge, this joint generally consisting of a number of rings, attached in a row to each of the transverse end edges, through which is passed a retaining pin that is common to the rings of both transverse end edges.

Normally, metal rings are used in making such joiners, since they are strong and easy to attach to the edge of the belt. However, in the cases of conveyors used in conjunction with metal detectors, conveyors for conveying pharmaceutical or delicate products and conveyors for food products and the like, joiners of a plastic material may be used.

Among these joiners made of a plastic material, joiners consisting of a plastic spiral at each transverse end edge attached to a piece of cloth vulcanized to the belt are familiar in the case of very small drum sizes. For example, mention can be made of those found on the market under the trade name "ALLIGATOR", made by the Flexible Steel Lacing Company.

However, such joiners prove awkward to assemble, since the plastic spirals tend to become skewed or twisted and consequently difficult to handle and to vulcanize.

SUMMARY OF THE INVENTION

The end joiner for continuous belts for conveyors that is the object of this invention completely eliminates the above-mentioned drawbacks and, in essence, is characterized in that each of said hinge halves consists of a substantially equal number of members that can be coupled together longitudinally in a row, each coupling member consisting at least of one ring fitted with one male coupler and one female coupler, the two couplers lying opposite and coaxial to each other with the male coupler being designed to link up with the female coupler of another coupling member to form a half hinge, these linearly linked couplers forming a rod, all designed to form the hinge in such a way that the rings of the two hinge halves interleave, with the openings of their rings substantially aligned and threaded onto a pin that passes through each of them.

According to another characteristic of the invention, the rings of each linkable member are inserted into the weft threads of a longitudinal band with no warp threads in the supporting fabric, which is folded over on itself, hence surrounding the parts of each rod lying between each two consecutive rings by the weft threads.

According to another characteristic of the invention, said band with no warp threads in the supporting fabric is situated at different distances from the edges of the supporting fabric.

BRIEF DESCRIPTION OF THE DRAWINGS

The attached drawings illustrate, by way of non-restrictive example, one embodiment of the end joiner for continuous belts for conveyors that is the object of this invention.

FIGS. 1 and 2 show respectively a plan view and a cross section of the joiner of this invention;

FIG. 3 shows an enlarged and partially cut-away view of the joiner shown in FIG. 1;

FIGS. 4 and 5 show respectively front and side views of a linkable member consisting of a ring;

FIG. 6 shows a side view, partially cut away, of two linkable members—of the kind shown in FIGS. 4 and 5—linked together;

FIG. 7 is a diagrammatic view of a piece of the supporting fabric;

FIG. 8 is a side view, cut away, of a linkable member consisting of a number of rings; and FIG. 9 is a side view of two linkable members—of the kind shown in FIG. 8—linked together.

DETAILED DESCRIPTION OF THE INVENTION

In these drawings it can be seen that the joiner for the ends 1 and 2 of continuous belts 3 for conveyors comprises a hinge 4 in a plastic material joined to the weft 14 of the supporting fabric 5, fused into the continuous belt 3 by vulcanizing.

The joiner comprises two equal hinge halves, laid out along each transverse end edge of the belt, and arranged to link up in the joiner thus forming the hinge 4.

Each of these hinge halves consists of a substantially equal number of members 6 that can be linked together in a row. Each linkable member 6 consists of at least one ring 7, fitted with a male coupler 9 and a female coupler 10.

The female coupler 10 is coaxial with the male coupler 9, and is arranged to couple up with a matching male coupler 9 of an adjoining linkable member 6 to form a hinge half.

In FIGS. 3, 6, 8 and 9, it can clearly be seen that the set of these male 9 and female 10 couplers when coupled form a linear rod 11.

Under these circumstances, the set is arranged to form the hinge 4, in such a way that the rings 7 of the two hinge halves are interleaved, with each of their openings 12 substantially aligned and held together by a pin 13 threaded through the opening in the rings.

The rings 7 of each linkable member 6 are inserted into the weft threads 14 of a longitudinal section 15 without warp threads of the supporting fabric (FIG. 7). This fabric 5 is folded over on itself, and so the parts of each rod 11 lying between each two consecutive rings 7 are surrounded by the weft yarns 14 (FIG. 3).

The section 15 of the supporting fabric 5 without warp threads is situated at different distances from the edges 16 and 17 of the supporting fabric 5. This means that, after vulcanizing the supporting fabric 5 to the end 1, 2 of the continuous belt 3, the change in thickness of the latter owing to the thickness of the fabric itself 5 forms a gradual, double rise.

The end joiner or hinge of the invention comprises a means for connecting opposite ends of a material suitable to form a continuous belt, wherein said joiner comprises a hinge comprising a pin and two half hinges. Each of said half hinges comprises a series of members comprising a ring, a male coupler and a female coupler. The male and female couplers are co-axially disposed at opposing ends of said member such that said male coupler of one member may contact and longitudinally connect with said female coupler of an adjacent member. The members are connected such that together they form a rod, with the rings of said members situated such that said rings are substantially longitudinally aligned when said members are coupled one, so as to receive said pin passing through said rings. The configuration of the rod and rings of each half hinge component is such that the weft threads of the belt material may be folded over the rod so as to surround the parts of each rod lying between consecutive rings and secure the half hinge in the material. The two hinge halves may be linked by means of a pin threaded the rings of adjacent hinge halves. The material with the hinge embedded therein may be fused by vulcanizing the belt material.

Having described the nature of the invention sufficiently, it is pointed out that anything not altering, changing or modifying its fundamental principle may be changed in detail, the essential matter, for which a patent of invention for 20 years is sought, being summarized in the following claims.

What is claimed is:

1. An end joiner for continuous belts for conveyors, of the type that comprises a hinge in a plastic material joined into weft threads of a supporting fabric fused into the continuous belt by vulcanizing, comprising two equal hinge halves, one at each transverse end edge of the belt, designed to link together in joiner forming the hinge, characterized in that each of said hinge halves consists of a substantially equal number of members that can be coupled together longitudinally in a line, each coupling member consisting of at least one ring with an opening and one male coupler and one female coupler, the two couplers lying opposite and coaxial to each other with a male coupler being designed to link up with a female coupler of another coupling member to form a half hinge, these linearly linked couplers forming a rod, all designed to form the hinge in such a way that the rings of the two hinge halves interleave, with the openings of their rings substantially aligned and threaded onto a pin that passes through each of them.

2. A joiner according to claim 1, characterized in that the rings of each member are inserted into the weft threads of a longitudinal band with no warp threads in the supporting fabric, which is folded over on itself, hence surrounding the parts of each rod lying between each two consecutive rings by the weft threads.

3. A joiner according to claim 2, characterized in that said band with no warp threads in the supporting fabric is situated at different distances from the edges of the supporting fabric.

4. An end joiner to form a continuous belt comprising a hinge, said hinge comprising two hinge halves, one at each transverse end edge of said belt, designed to link together to form said hinge, wherein each of said hinge halves comprises coupling members that can be coupled together longitudinally in a line to form a hinge half, each said coupling member comprising at least one ring with an opening, one male coupler and one female coupler, said male and female couplers lying opposite and coaxial to each other with a male coupler being designed to link up with a female coupler of another coupling member to form said hinge half, these longitudinally linked couplers forming a rod, all designed to form said hinge in such a way that said rings of said two hinge halves interleave, with the openings of said rings substantially aligned and threaded onto a pin that passes through each opening of said rings.

5. An end joiner for connecting opposite ends of a material suitable to form a continuous belt, said joiner comprising a hinge, said hinge comprising a pin and two half hinges, each of said half hinges comprising a series of adjacent members, each of said members comprising a ring, a male coupler and a female coupler, said couplers co-axially disposed at opposing ends of said member such that a male coupler of one member may contact and longitudinally connect with a female coupler of an adjacent member thereby forming a rod, and said rings of said members are situated such that said rings are substantially longitudinally aligned when said members are coupled one to another so as to receive said pin passing through said rings.

6. The end joiner of claim 5 wherein said continuous belt is vulcanized.

7. A continuous belt comprising a material suitable for forming a continuous belt and an end joiner for connecting opposite ends of said suitable material, said joiner comprising a hinge, said hinge comprising a pin and two half hinges, each of said half hinges comprising a series of adjacent members comprising a ring, a male coupler and a female coupler, said couplers co-axially disposed at opposing ends of said member such that a male coupler of one member may contact and longitudinally connect with a female coupler of an adjacent member thereby forming a rod, and said ring of said member situated such that said rings are substantially longitudinally aligned when said members are coupled one to another so as to receive said pin passing through said rings, wherein said rings of each member are inserted into weft threads of said material at a longitudinal band of said material with no warp threads, which material is folded over on itself, surrounding said rod lying between each two consecutive rings by said weft threads.

8. The belt according to claim 7, wherein said band of said material with no warp threads is situated at different distances from said edges of said material.

9. A hinge for connecting opposite ends of a material suitable to form a continuous belt, said hinge comprising a pin and two half hinges, each of said half hinges comprising a series of adjacent members, each of said members comprising a ring, a male coupler and a female coupler, said couplers co-axially disposed at opposing ends of said member such that a male coupler of one member may contact and longitudinally connect with a female coupler of an adjacent member thereby forming a rod, and said rings of said members are situated such that said rings are substantially longitudinally aligned when said members are coupled one to another so as to receive said pin passing through said rings.

* * * * *